May 2, 1933.  J. R. REYBURN  1,907,092
PROCESS OF AND MEANS FOR ATTACHING REENFORCEMENTS TO EXTENDED ARTICLES
Filed May 19, 1932  2 Sheets-Sheet 1
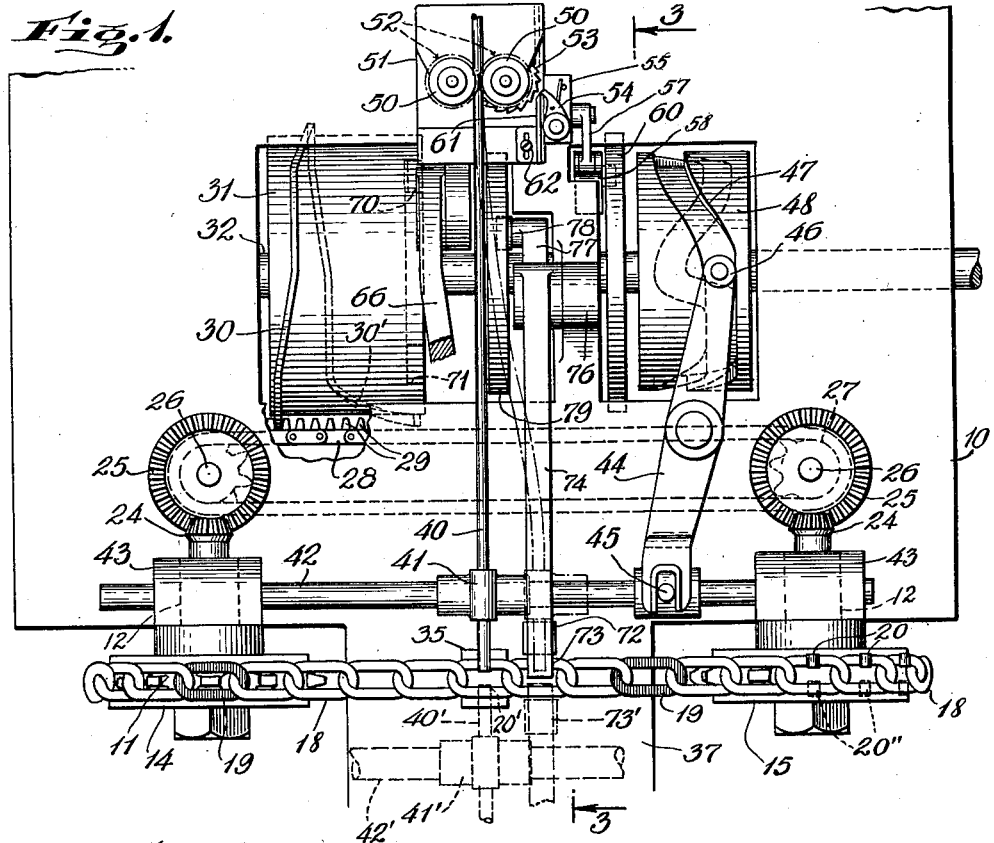
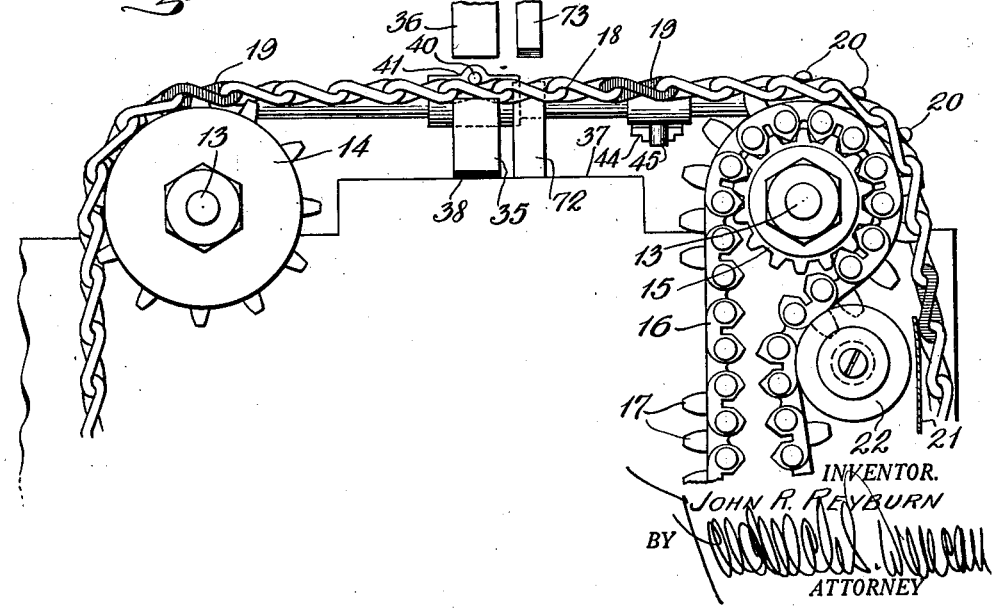
INVENTOR.
JOHN R. REYBURN
BY
ATTORNEY

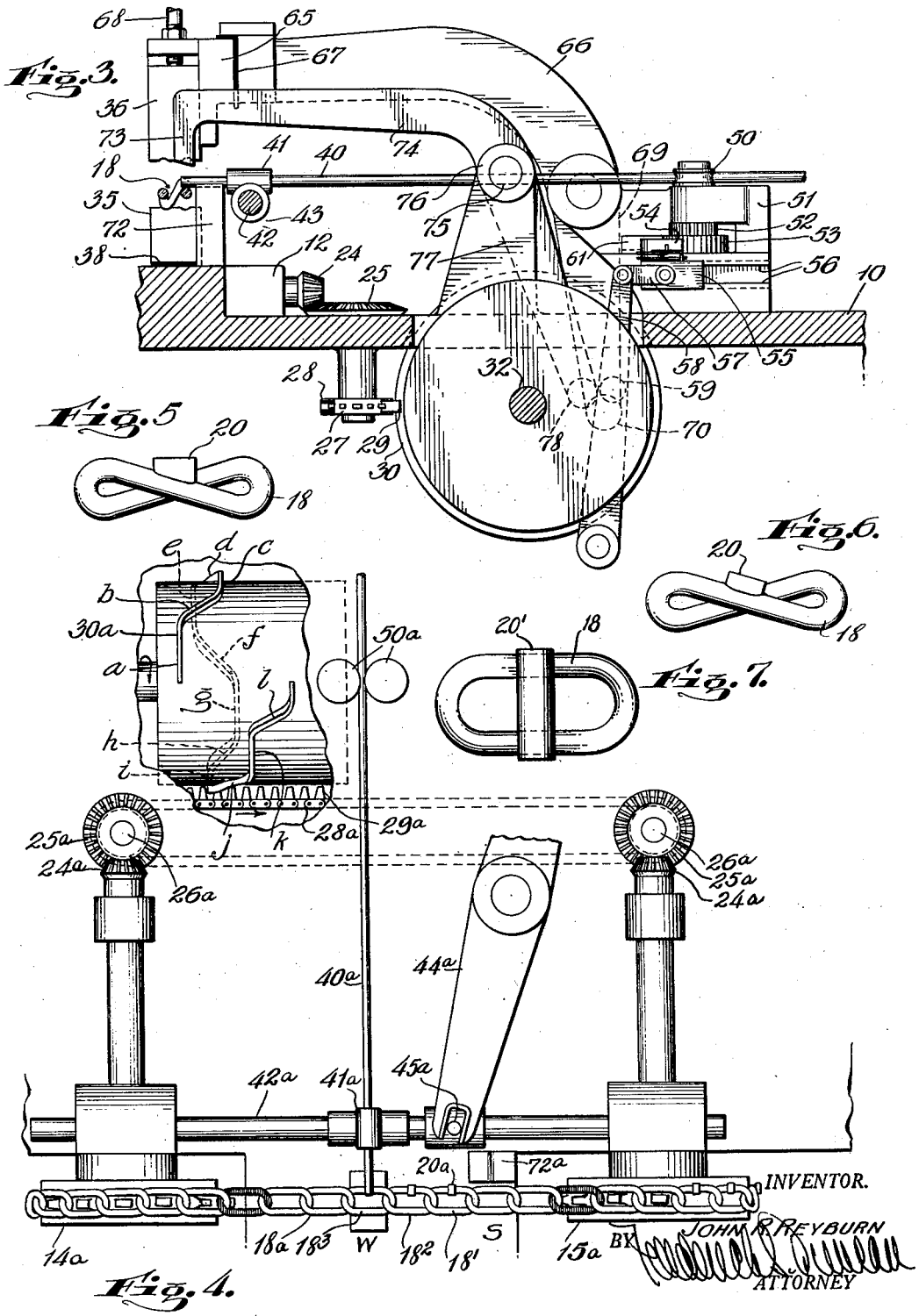
May 2, 1933.     J. R. REYBURN     1,907,092
PROCESS OF AND MEANS FOR ATTACHING REENFORCEMENTS TO EXTENDED ARTICLES
Filed May 19, 1932     2 Sheets-Sheet 2

Patented May 2, 1933

1,907,092

UNITED STATES PATENT OFFICE

JOHN R. REYBURN, OF FAIRFIELD, CONNECTICUT, ASSIGNOR TO AMERICAN CHAIN COMPANY, INC., OF BRIDGEPORT, CONNECTICUT, A CORPORATION OF NEW YORK

PROCESS OF AND MEANS FOR ATTACHING REENFORCEMENTS TO EXTENDED ARTICLES

Application filed May 19, 1932. Serial No. 612,227.

The present invention relates to the attachment of reenforcement parts to extended articles and may be used to advantage in welding reenforcement bars, lugs or the like to links in anti-skid cross-chains for tire chains, although the invention may be utilized in any field of application for which it is adapted by the nature of the improvements.

In welding a lug or reenforcement to a chain or other extended wire structure, particularly if the lug is short and round, considerable difficulty is experienced in feeding the lug to the part to which it is to be attached and holding it there while it is being welded.

An object of the present invention is to provide a method of avoiding this difficulty by forming the lug from a continuous length of stock such as a rod or a wire, and severing the lug from the stock after it has been welded fast. The stock thus serves virtually as a handle for feeding the lug and holding it in proper position.

In carrying out my invention, I prefer to attach the reenforcement to a chain or other extended article by means of electric resistance welding, but since the electrodes employed for such welding have to be massive it is difficult to provide the necessary clearance at the welding point for the cutting mechanism to sever the welded lug from the stock, hence my method includes the step of moving the extended article with the weld while the reenforcement remains attached to the stock, to a severing point clear of the welding point, and there to sever the reenforcement from the stock. After the reenforcement has been severed the stock is returned to welding position for the next weld. It is an object of my invention, therefore, to provide apparatus which will automatically carry out the methods described above.

A convenient arrangement is to space the severing point from the welding point, a distance equal to that between welds. For instance, if it be desired to apply lugs to successive links of a chain, the welding and severing points can be conveniently separated by a space equal to the length of a link so that as one link with its weld is advanced to the severing point the next link will be brought into welding position and no other feed of the chain will be necessary except that of advancing it intermittently in steps of one link's length. However, such convenient arrangement is not always possible and my invention has for an object to provide a variable feed for the chain or other extended wire structure, which will not only feed the same forward by steps equal to the spacing between the welding and severing position, but will also, after each severing operation, feed the chain either forward or in reverse, as the case may be, to bring the next weld point of the chain to proper welding position.

Another object of the invention is to provide a machine in which lugs may be attached to any predetermined points on an extended wire structure. This in the case of a chain reenforcement may be applied on certain links and not on others and also on preselected parts of a link.

With these objects in view and others which will appear hereinafter, I shall now describe a preferred embodiment of my invention and a modification thereof and thereafter shall point out the novelty and scope of the invention in the claims.

In the accompanying drawings;

Figure 1 is a plan view of a welding machine embodying my invention, with a portion thereof broken away;

Fig. 2 is a fragmental front elevation of the same;

Fig. 3 is a view in section taken substantially on the line 3—3 of Fig. 1;

Fig. 4 is a fragmental plan view of another embodiment of the invention;

Figs. 5 and 6 are edge views of chain links with different forms of lugs welded thereto; and Fig. 7 is a plan view of a link with a bar welded thereacross.

The machine shown in the accompanying drawings has a main frame which may be in the form of a table, the top of which is indicated at 10. A pair of bearings 12 are formed on the table top or plate 10 at one edge thereof. These bearings are suitably spaced apart, as clearly shown in Fig. 1. Journalled in the bearings are two shafts 13. One of these shafts has a sprocket wheel 14 fixed to the outer end thereof, while the other shaft has a sprocket 15 fixed to its outer end. The sprocket wheel 15 is of smaller diameter than the sprocket wheel 14, as shown in Fig. 2, and an endless chain belt 16 is passed about the sprocket wheel 15 and also about a lower sprocket, not shown. Not only is each link of the chain belt formed with inwardly projecting teeth that mesh with the teeth of the wheel 15, but some links are also provided with an outwardly projecting tooth 17. The teeth 17 are adapted to engage the links of a chain 18 to which the lugs on bars are not to be applied. The chain 18 is also engaged by the teeth of the sprocket wheel 14, being stretched between the latter and the belt 16. The effective diameter of the sprocket wheel 15 with the belt thereon is substantially the same as the diameter of the sprocket wheel 14 so that the chain 18 runs horizontally from sprocket wheel 14 to belt 16.

The chain 18 to which the lugs are to be applied may be composed of a series of short lengths temporarily connected by removable links 19. In the particular chain here illustrated, the chain lengths are composed of seven links each, and lugs 20 are applied to the three middle links only of each length, leaving two links at each end without lugs thereon. In order that the teeth 17 may not clash or interfere with the lugs 20, such teeth are omitted from certain of the links of the belt 16. As shown in Fig. 2, the belt is provided with sets of five teeth 17 separated by blanks for three tooth spacings. Thus the teeth 17 will enter only such links of the chain 18 as have no lugs thereon.

The chain 18 is fed from left to right as viewed in Figs. 1 and 2, and after leaving the belt 16 is guided away therefrom by a plate 21. An idler 22 on the inner side of the guide plate 21 serves to draw the belt 16 away from the chain 18 and also to take up slack therein.

The sprocket wheels 13 and 14 are driven by cam mechanism, as will now be explained, so that there will be a step by step feed of the chain to permit of attaching the lugs 20 thereto and a rapid feed of the chain in those parts which are to bear no lugs. Each shaft 13 bears a bevel pinion 24 at its inner end and this bevel pinion engages bevel gears 25 mounted on vertical shafts 26 which pass through the plate 10 and are fitted with sprocket wheels 27 at their lower ends, as shown in Fig. 3. An endless chain belt 28 is stretched about the sprocket wheels 27. Each link of this chain belt is provided with outwardly projecting teeth 29 which are adapted to engage a rib 30 formed on a drum cam 31. The latter is fixed upon a cam shaft 32 suitably journalled in bearings (not shown) depending from the plate 10. The shape of the rib 30 is such as to cause a variable movement of the chain 28 and thereby impart a variable movement to the chain 18, as will be explained more fully hereinafter.

Substantially midway between the shafts 13, a fixed electrode 35 is provided over which the chain 18 is drawn. This electrode is preferably formed on its upper face with a seat for a link of the chain 18 on which a lug 20 is to be welded. In order to prevent abrasion of this electrode it is preferably located slightly below the normal run of the chain 18 and when the welding operation is performed the chain is pressed down upon the electrode 35 by an upper electrode 36. The electrode 35 is supported on a shelf 37 extending from the plate 10, and suitable insulation material 38 is inserted between the electrode 35 and said shelf 37.

The lugs 20 which are applied to the links of the chain 18 are taken from a continuous wire or rod 40. The end of this rod is inserted between the upper electrode 36 and the chain and after being welded to the chain must move laterally with the chain to a position where the welded part may be cut off from the main stock, after which the latter is returned to its original position and again advanced under the electrode 36 and over another link of the chain 18. Obviously, the movement of the rod 40 with the chain 18 could be effected by movement of the chain alone and my invention contemplates a machine in which such lateral feed of the rod 40 is employed. However, I prefer to move the rod positively by separate cam actuated mechanism.

As clearly shown in Fig. 1, the rod 40 passes through a guide block 41 which is fixed upon a reciprocating shaft 42. The latter is mounted to slide in suitable bearings 43 disposed above the bearings 12. A lever 44 fulcrumed on the plate 10 is forked at one end to engage a pin 45 fixed to the shaft 42. The opposite end of the lever carries a roller 46 which engages a groove 47 in a drum cam 48 fixed on the cam shaft 32. Under control of the cam groove 47 the shaft 42 will be variably reciprocated to carry the rod 40 with the chain 18, while welded thereto, and to return the rod 40 to original position as soon as the welded part thereof has been severed from the chain.

The wire 40 is led from a suitable reel, not shown, by means of a pair of feed rollers 50 bearing on opposite sides thereof. These rollers are suitably mounted in a bracket 51 fixed to the plate 10. The rollers are fixed on vertical shafts which are geared together by means of gears 52 so that they will turn oppositely but in unison. One of said vertical shafts has a ratchet wheel 53 fixed thereon which is adapted to be engaged by a spring-pressed pawl 54 pivotally mounted on a slide plate 55. This plate is arranged to slide in ways 56 (Fig. 3) formed in one side of the bracket 51. The plate 55 is connected by a link 57 to a lever 58 which bears a roller 59 engaging a groove in a cam 60 fixed upon the cam shaft 32. Thus under control of the cam 60, the pawl 54 will be reciprocated at suitable time intervals to turn the rollers 50 and feed the rod 40 across the chain 18.

In some cases it may be desirable to have the reenforcement on the chain in the form of a bar spanning the link, as shown at 20' in Fig. 7, while in other cases the reinforcement will consist of a short lug welded to one side of the link. To provide for variations in feed necessary for such variations of length of reenforcement, I have arranged the cam 60 to give the pawl 54 a stroke long enough for the maximum feed of the rod 40. But the effective stroke of the pawl may be reduced as required. To this end a plate 61 is provided which has screw and slot adjustment 62 on the bracket 51. This plate is adjustable so that it may be interposed between the pawl 54 and the ratchet wheel 53 to any desired extent to vary the point in its stroke at which the pawl will engage the ratchet wheel 53.

The electrode 36 is mounted in an adjustable block 65 which in turn is carried by a lever 66, pivoted to the bracket 51. Suitable insulation material 67 is provided between the arm 66 and the block 65. A set screw 68 is provided to adjust the electrode 36 with respect to the block 65. A depending arm 69 of the lever 66 bears a roller 70 which engages a cam groove 71 in the adjacent face of the drum cam 31 whereby the lever is oscillated at suitable time intervals.

In order to provide for the large current employed in welding operation, the electrodes 35 and 36 must necessarily be massive, and it would be inconvenient to cut off the welded part of the wire 40 while the chain remained in the welding position. For this reason the severing of the lug 20 from the stock 40 is effected to one side of the point where the lug is welded to the chain. In Fig. 1, the severing position is shown as spaced from the welding position by a distance equal to one of the links of the chain 18. This makes a convenient arrangement, but as will be explained later on, provision may be made for locating the severing point at a greater distance from the welding point.

At the severing point, a fixed shear block 72 is provided which is just clear of the chain 18, but in a position for the stock 40 to ride upon the block as it is advanced by the cam 48. This shear block is preferably formed with a slight depression in its upper face to center the stock therein. Cooperating with the shear block 72 is a shear blade 73 carried by a lever 74. The latter is fulcrumed on a stud 75 projecting from a bracket 76 rising from the plate 10. The lever 74 has a depending arm 77 which bears a roller 78 engaging a groove in a cam 79 so that under control of this cam the blade 73 will be lowered at the proper instant to shear the lug 20 from the stock 40. The lever 74 is obviously made sufficiently massive to stand the shearing strain.

The operation of the machine will now be readily understood. The chain 18 is advanced under control of the rib 30 of drum cam 31 and is momentarily arrested with one of the links of the chain overlying the electrode 35. At the same time the stock 40 is fed so that the end thereof will overlap the link above the electrode 35. Then the cam 31 causes the electrode 36 to move downward in contact with the overhanging portion of the rod 40 causing said portion to be welded to the link of the chain 18. As electrode 36 moves downward the link thereunder is pressed firmly into the seat in the electrode 35 so that a good electrical contact is made for the passage of the welding current through the wire 40 and the chain link thereunder. Immediately thereafter the electrode 36 rises and the chain is advanced a link's length. Simultaneously with this movement the cam 48 operates to move the shaft 42 toward the right, as viewed in Fig. 1, and the stock 40 will then be bent to the broken line position shown in Fig. 1, so that it overlies the shear block 72. On the next operation the shear blade 73 descends and cuts off the welded portion 20 from the stock 40 and the cam 48 then returns the rod 40 to its original position while the cam 60 feeds the stock 40 forward so as to overlap the next link of the chain. This process is repeated so as to apply lugs 20 to three successive links. Thereafter there is a dwell in the operation of cams 48 and 60 and cam groove 71, controlling the electrode 36, while a portion 30' of the rib 30 advances the chain 18 five link lengths. This completes a cycle of operations and the welding of lugs 20 to the next three links is then begun.

It is to be noted that the stock 40 is bent from welding position to severing position, but the portion of rod in which the bend takes place is long enough to prevent bending of the stock beyond its elastic limit. As previously stated the means for shifting the stock positively between welding and severing points may be omitted in which case as soon as the welded end of the stock has been severed the remaining stock will return by its own elasticity to the welding point since it is not bent beyond its elastic limit.

As stated above, it sometimes happens that the links are too short or else the electrodes are too broad to permit of placing the severing mechanism within one link length of the welding point. Such a condition is taken care of by the modified structure shown in Fig. 4. Here the severing point S is located at a distance of three link lengths from the welding point W. However, in order to weld lugs on successive links it is necessary not only to return the stock to welding position but also to retract the chain 18 after the lug has been severed. This is taken care of by proper arrangement of the cam controlling the feed of the chain.

In this modified form of machine, the parts which correspond to those shown in Fig. 1 are given the same reference numerals with the suffix *a*. It will be observed that the mechanism is very much the same in the two figures, the principal difference being in the spacing of the severing point from the welding point and in the shape of the rib 30a as compared with rib 30. This rib 30a has a portion *a* which holds the chain 18 stationary while a lug is being welded to the link 18'. This is followed by a portion *b* which advances the chain 18a a distance of three link lengths so as to bring the lug 20a on the link 18' to the severing point S. Here the lug is severed from the stock, while the chain is held stationary by a portion *c* of the rib. Thereafter the rib curves backward as indicated at *d* to retract the chain 18a a distance of two link lengths so that the link 18² immediately following link 18' will now be in the welding position. During the second weld the chain 18a will be held stationary by a portion *e* of the rib. Thereafter a portion *f* will advance the chain three link lengths to carry the link 18² to the severing position where it will be held by a portion *g* of the rib until the lug is severed from the stock. Thereafter the chain 18a will be retracted two link lengths by a portion *h* of the rib so as to bring the link 18³ to welding position. The third weld will then take place while the chain is being held stationary by a portion *i* of the rib. Thereafter, the chain will again be advanced three link lengths by a portion *j* of the rib and will be arrested during the severing of the third lug by a portion *k* of the rib. Since the fourth link back of link 18³ is now at the welding point the chain is advanced through a further distance of three link lengths by a portion *l* of the rib and the cycle of operations is then resumed. Obviously other variations in the feed of the chain may be made to weld lugs thereto at different points of the chain.

Instead of providing a lug 20 on one side only of each link, a lug may also be provided on the opposite side thereof by repeating part of the mechanism on the opposite side of the chain. This is indicated in broken lines in Fig. 1. An opposing length of wire stock 40' may be fed in the same manner as is the wire stock 40, from the opposite side of the chain and may be guided in a block 41' carried by a reciprocating shaft 42'. The latter may be moved by mechanism corresponding to that which moves the shaft 42 so as to carry the welded part of the stock 40' to the severing position where suitable severing mechanism 73' may be employed to sever the welded portion 20'' from the main stock 40'. The welding electrodes 35 and 36 are broad enough to span the width of the chain links, so that they will weld simultaneously a part of the rod 40 and a part of the rod 41 to the chain link.

The shape of the reenforcements may be varied by varying the cross-section of the stock 40 or by forming the stock of a series of preformed reenforcement parts suitably connected into a continuous length. Some of the various forms of reenforcements are shown in Figs. 5 to 7 and it will be understood that my invention is not limited to any particular form of lug.

While I have described a preferred embodiment of my invention and a modification thereof it is to be understood that these are to be taken as illustrative and not limitative of my invention, and I reserve the right to make such changes in form, construction, arrangement of parts and method of operation as fall within the spirit and scope of the following claims.

I claim:—

1. The method of attaching a reenforcement to an article, which consists in feeding an end of a strip of reenforcement stock to welding position with respect to the article, welding said end to the article, shifting the article with said welded end clear of the welding position, and thereafter severing the welded end from the stock.

2. The method of attaching reenforcement to an extended article at a pair of spaced portions thereof, which comprises the steps of locating one of the portions at a welding point, feeding an end of a strip of reenforcement stock transversely across the article at said point, welding said end to the article, bending the strip laterally to an extent within the elastic limit of the same so as to shift the welded end clear of the welding position, severing the welded end from the strip and permitting the strip to spring back to the welding position, and repeating the above-named steps to attach a reenforcement from the strip to the other of said portions.

3. The method of attaching reenforcements to an extended article at spaced points thereon, which comprises the steps of feeding an end of a strip of reenforcement stock to welding position with respect to the article at one of said points, welding said end to the article, advancing the article lengthwise through a distance such as to bring the next said point to welding position, thereafter severing the welded end from the stock, returning the stock to the welding position, and repeating the above-named steps to attach a reenforcement from the stock at said next point.

4. The method of attaching reenforcements to an extended article at spaced points thereon, which comprises the steps of feeding an end of a strip of reenforcement stock to welding position with respect to the article at one of said points, welding said end to the article, shifting the article clear of the welding position, thereafter severing said welded end from the strip, returning the stock to the welding position, shifting the article to bring the next said point to the welding position, and repeating the above-named steps to attach a reenforcement from the stock to said next point.

5. The method of attaching reenforcements to an extended article at a pair of spaced points thereon, which comprises the steps of feeding an end of a strip of reenforcement stock to welding position with respect to the article at one of said points, welding said end to the article, advancing the article lengthwise through a distance greater than that between said points, severing said welded end from the strip, returning the stock to the welding position, retracting the article to bring the next said point to the welding position, and repeating the above-named steps to attach a reenforcement from the stock to said next point.

6. The method of attaching reenforcements to the links of a chain, which includes the steps of feeding an end of a strip of reenforcement stock transversely across one of said links, welding said end to said link, shifting the chain a link's length to bring the next link thereof to welding position, severing the welded end of the strip from the stock, and returning the stock to welding position.

7. The method of attaching reenforcements to the links of a chain, which includes the steps of feeding an end of a strip of reenforcement stock transversely over a side strand of one of said links, welding said end to said strand, moving the chain together with the weld clear of the welding position, severing the welded end from the stock, returning the stock to welding position, shifting the chain to bring a predetermined link thereof in position for the next welding operation, and repeating the above-named steps in recurring sequence to attach reenforcements on predetermined links of the chain.

8. A welding machine for attaching a reenforcement to an extended article, said machine comprising means for feeding a strip of reenforcement stock to welding position with respect to said article at a welding point, welding means at said point for attaching the stock to the article, means for shifting the latter to a severing point clear of the welding means, and severing means at the latter point for severing the attached portion of the stock from the main body thereof.

9. A welding machine for attaching a reenforcement to an extended article, said machine comprising means for feeding a strip of reenforcement stock to welding position with respect to said article at a welding point, welding means at said point for attaching the stock to the article, means for shifting the latter to a severing point clear of the welding means, means at the severing point for severing the welded portion of the stock from the main body thereof, and driving mechanism for operating all of said means in predetermined time relation.

10. A welding machine for attaching a reenforcement to an extended article, said machine comprising means for feeding a strip of reenforcement stock to welding position with respect to said article at a welding point, welding means at said point for attaching the stock to the article, means for shifting the latter to a severing point clear of the welding means, means at the latter point for severing the attached portion of the stock from the main body thereof, means for returning the free end of the stock to the welding point, and driving mechanism for operating all of said means in predetermined time relation.

11. A welding machine for attaching reenforcements to the links of a chain, said machine comprising means for feeding a strip of reenforcement stock to one of said links at a welding point, means at said point for welding the strip to said link, means for advancing the chain a link's length to bring the link and a weld thereon to a severing point and simultaneously to bring the next link of the chain to the welding point, means at the severing point for severing the welded portion of the stock from the main body thereof, means for returning the free end of the stock to the welding point, and mechanism for operating all of said means in mutually timed relation and in recurring sequence.

12. A welding machine for attaching reenforcements to the links of a chain, said machine comprising means for feeding a strip of reenforcement stock to one of said links at a welding point, welding means at said point for welding the strip to said link, means for advancing the chain a link's length to bring the link and the weld thereon to a severing point and simultaneously to bring the next link of the chain to the welding point, means at the severing point for severing the welded portion of the strip from the stock, means for returning the free end of the stock to the welding point, mechanism for actuating all of said means in timed relation and in recurring sequence, and means for additionally advancing the chain at intervals to omit attachment of reenforcements to certain links of the chain.

13. A welding machine for attaching reenforcements to the links of a chain, said machine comprising feeding means for projecting an end of a strip of reenforcement stock transversely across the chain at a welding point, welding mechanism at said point for attaching the projecting end of the strip to the chain, means for shifting the welded end of the stock to a severing point spaced a link's length away from the welding point whereby the next link will be brought to the welding point, means at the severing point for cutting said welded end free from the stock, means for returning the stock to the welding point, and mechanism for actuating all of said means in mutually timed relation and in recurring sequence.

14. A welding machine for attaching reenforcements to selected links of a chain, said machine comprising chain feeding means for feeding the preselected links sequentially to a welding position, stock feeding means for projecting an end of a strip of reenforcement stock transversely across the chain at the welding point, welding mechanism at said point for attaching the projecting end of the strip to the link at said point, means for shifting the welded end of the stock to a severing point, severing means at the latter point for cutting said welded end free from the stock, and means for returning the stock to the welding point for attachment to the next of the links.

15. A welding machine for attaching reenforcements to selected links of a chain, said machine comprising chain feeding means for feeding the preselected links sequentially to a welding position, stock feeding means for projecting an end of a strip of reenforcement stock transversely across a side strand of the link at the welding point, welding mechanism at said point for attaching said end to said strand, means for shifting the welded end of the stock to a severing point, severing means at the latter point for cutting said welded end free from the stock, and means for returning the stock to the welding point for attachment to the next of said links.

16. A welding machine for attaching reenforcements to the links of a chain, said machine comprising chain feeding means for feeding the chain links to welding position, stock feeding means for projecting an end of a strip of reenforcement stock transversely across the chain at the welding point, welding mechanism at said point for attaching the projecting end of the strip to the chain, means for shifting the welded end of the stock to a severing point, means at the latter point for severing said welded end free from the stock, means for returning the stock to the welding point, and means for varying the feed of the reenforcement stock.

17. A welding machine for attaching reenforcements to selected links of a chain, said machine comprising means for supporting one of the links at a welding point, feeding means for projecting an end of a strip of reenforcement stock across said link, welding mechanism for attaching said end to said link, means for advancing the chain lengthwise with the attached reenforcement to a severing point, severing means at the latter point for cutting said end from the reenforcement stock, means for returning the stock to the welding point, and means for moving the chain to bring the next selected link to the welding position.

18. A welding machine for attaching reenforcements to selected links of a chain, said machine comprising means for positioning one of said links at a welding point, feeding means for projecting an end of a strip of reenforcement stock across said link, welding mechanism for attaching said end to said link, means for advancing the chain lengthwise with the attached reenforcement to a severing point spaced more than a link's length away from the welding point, severing means at the severing point for cutting said end from the reenforcement stock, means for returning the stock to the welding point, and means for retracting the chain to bring the next selected link to the welding position.

19. A welding machine for attaching reenforcements to links of a chain, said machine comprising means for positioning one of the links at a welding point, means for feeding an end of a strip of reenforcement stock transversely across the chain at the welded point, welding mechanism at said point for attaching the projecting end of the strip to the chain, means for advancing the chain to a severing point clear of the welding point with the stock attached thereto whereby the stock will be bent out of its normal position, the position of the feeding means with respect to the welding point and the severing point being such as to prevent the stock from being bent beyond its elastic limit, means at the severing point for cutting the welded end free from the stock, whereby the stock will tend to return to the welding point by its own elasticity, and means for feeding the chain to bring the next selected link to the welding point.

In testimony whereof, I have signed this specification.

JOHN R. REYBURN.